US012631128B1

(12) United States Patent
Darling et al.

(10) Patent No.: US 12,631,128 B1
(45) Date of Patent: May 19, 2026

(54) FULL RING SHROUD SYSTEM AND METHOD WITH STRESS MANAGEMENT

(71) Applicant: HONEYWELL INTERNATIONAL INC., Charlotte, NC (US)

(72) Inventors: Timothy Darling, Phoenix, AZ (US); David Waldman, Phoenix, AZ (US); Ryon Stanley, Phoenix, AZ (US); Jason Smoke, Phoenix, AZ (US); Courtney Murphy, Phoenix, AZ (US); William Weiss, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 19/179,188

(22) Filed: Apr. 15, 2025

(51) Int. Cl.
*F01D 11/08* (2006.01)
*F01D 25/14* (2006.01)
*F01D 25/24* (2006.01)

(52) U.S. Cl.
CPC ........... *F01D 25/24* (2013.01); *F01D 25/145* (2013.01); *F05D 2300/611* (2013.01)

(58) Field of Classification Search
CPC ........ F01D 11/08; F01D 25/24; F01D 25/145; F05D 2240/11; F05D 2240/55; F05D 2230/60
See application file for complete search history.

(56) References Cited

U.S. PATENT DOCUMENTS

| | | | |
|---|---|---|---|
| 6,884,026 | B2 | 4/2005 | Glynn et al. |
| 8,303,247 | B2 | 11/2012 | Schlichting et al. |
| 9,175,579 | B2 | 11/2015 | Franks et al. |
| 9,874,104 | B2 | 1/2018 | Shapiro |
| 10,577,978 | B2 | 3/2020 | Freeman et al. |
| 10,822,973 | B2 | 11/2020 | Parvis et al. |
| 11,629,607 | B2 | 4/2023 | Freeman et al. |
| 11,982,187 | B1 | 5/2024 | Rogers et al. |
| 2020/0116037 | A1* | 4/2020 | Zurmehly ............. F01D 25/246 |
| 2020/0200034 | A1* | 6/2020 | Filippi .................... F01D 25/24 |

(Continued)

OTHER PUBLICATIONS

APG, What Are Gas Turbine Shroud Blocks, downloaded from https://alliedpg.com/latest-articles/w hat-are-gas-turbine-shroud-blocks/ on Feb. 6, 2025.

(Continued)

*Primary Examiner* — Nathaniel E Wiehe
*Assistant Examiner* — Maxime M Adjagbe
(74) *Attorney, Agent, or Firm* — Ingrassia Fisher & Lorenz LLP

(57) ABSTRACT

A shroud system provides stress management for thermal gradients and compliance. The shroud system includes a support structure having an annular shape and defining a shroud cavity. A shroud is disposed, at least partly, in the shroud cavity. A rotor is rotatable about an axis and within the shroud. The shroud includes a body that has a first surface facing the rotor and a second surface facing away from the rotor. The shroud includes a pair of rails that are parallel to each other and that are spaced apart from each other. The rails extend from the second surface. The body has a thickness in a radial direction, and the thickness is less than a minimum compliance limit. The pair of rails provide stiffness to the shroud to enable the thickness of the body to be less than the minimum limit.

20 Claims, 3 Drawing Sheets

(56) References Cited

U.S. PATENT DOCUMENTS

| | | | | |
|---|---|---|---|---|
| 2021/0054757 | A1* | 2/2021 | Tableau | F23R 3/60 |
| 2021/0131301 | A1* | 5/2021 | Roy Thill | F01D 25/005 |

OTHER PUBLICATIONS

Standard Aero, CFM56-5B HPT Turbine Shroud Support Hanger, downloaded from standardaerocomponents.com/Capabilities/CapabilitiesNotices/CFM56/CFM565BHPTTurbineShroudSupportHanger.aspx on Feb. 7, 2025.

* cited by examiner

FULL RING SHROUD SYSTEM AND METHOD WITH STRESS MANAGEMENT

TECHNICAL FIELD

The present disclosure generally relates to rotating machinery, and more particularly relates to a shroud system and method that manages shroud stress and compliance among and between the shroud and a support case for applications such as a monolithic ceramic shroud in a gas turbine engine.

BACKGROUND

A gas turbine engine's efficiency is, at least in-part, defined by blade tip clearance. Maintaining a desired tip clearance throughout the entire range of engine operating conditions (the engine cycle) is challenging. Accordingly, turbine rotor blade stages in gas turbine engines may be provided with shrouds designed to achieve a desired level of engine performance. In certain applications, the shrouds may react to thermal excursions by expanding or growing radially at a different rate than surrounding components such as the case. In addition, the components coupling the shroud within the gas turbine engine may thermally expand or grow radially at a different rate than the shroud, which may cause these components to move relative to the shroud. The movement of these components relative to the shroud may result in wear on the shroud, positioning challenges and may impact life of the shroud. Tight control of the location of a shroud relative to its supporting structure is preferred. Such control is made more challenging when the material from which a shroud is made has a significantly different coefficient of thermal expansion (CTE) as compared to the material of the surrounding components. Increasing engine operating temperatures may be desirable for benefits such as increased power output, decreased fuel consumption, and/or others. Operating at higher temperatures increases the challenges associated with managing stress and controlling interfaces between a shroud and a turbine case.

Accordingly, it is desirable to provide a system for managing stress associated with a shroud within a gas turbine engine. It is also desirable to provide a system that considers thermal gradients in the shroud and interfaces between the shroud and the case. Furthermore, other desirable features and characteristics of the present disclosure will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In a number of embodiments, a shroud system provides stress management for thermal gradients and compliance. The shroud system includes a support structure having an annular shape and defining a shroud cavity. A shroud is disposed, at least partly, in the shroud cavity. A rotor is rotatable about an axis and within the shroud. The shroud includes a body that has a first surface facing the rotor and a second surface facing away from the rotor. The shroud includes a pair of rails that are parallel to each other and that are spaced apart from each other. The rails extend from the second surface. The body has a thickness in a radial direction, and the thickness is less than a minimum compliance limit. The pair of rails provide stiffness to the shroud to enable the thickness of the body to be less than the minimum limit.

In a number of additional embodiments, a method for managing stress in a shroud includes constructing a support structure in an annular shape with a shroud cavity defined by the support structure. A shroud is positioned, at least partly, in the shroud cavity. A rotor is operable to rotate about an axis, and within the shroud. A body of the shroud is formed with a first surface facing the rotor and a second surface facing away from the rotor. A pair of rails are formed by the shroud that are parallel to each other and that are spaced apart from each other. The pair of rails extends from the second surface. A minimum limit for a thickness of the body is defined in a radial direction. The thickness of the body is formed to be less than a minimum compliance limit. Stiffness is provided to the shroud by the pair of rails to enable the thickness of the body to be less than the minimum limit.

In a number of other embodiments, shroud system for a gas turbine engine includes a support structure constructed in an annular shape and to define a shroud cavity. A shroud is disposed, at least partly, in the shroud cavity. A rotor is rotatable about an axis and is disposed within the shroud. The shroud includes a body that has a first surface facing the rotor and a second surface facing away from the rotor. The shroud includes a pair of rails that are parallel to each other and that are spaced apart from each other. The rails extend from the second surface. The body has a thickness in a radial direction, and the thickness is less than a minimum limit. The minimum limit is a thickness value at which the body has surpassed a compliance limit where the compliance limit is defined by an amount of flexibility that results in shroud stresses and/or blade tip clearance control exceeding operational limits for the shroud. The pair of rails provide stiffness to the shroud to enable the thickness of the body to be less than the minimum limit. The shroud includes an environmental or thermal barrier coating with an interface at the first surface. The rails and the thickness, in combination, operate to maintain the interface below a threshold temperature. The threshold temperature is a temperature below which the shroud is maintained within operational parameters for the gas turbine engine and spalling at the interface is avoided.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
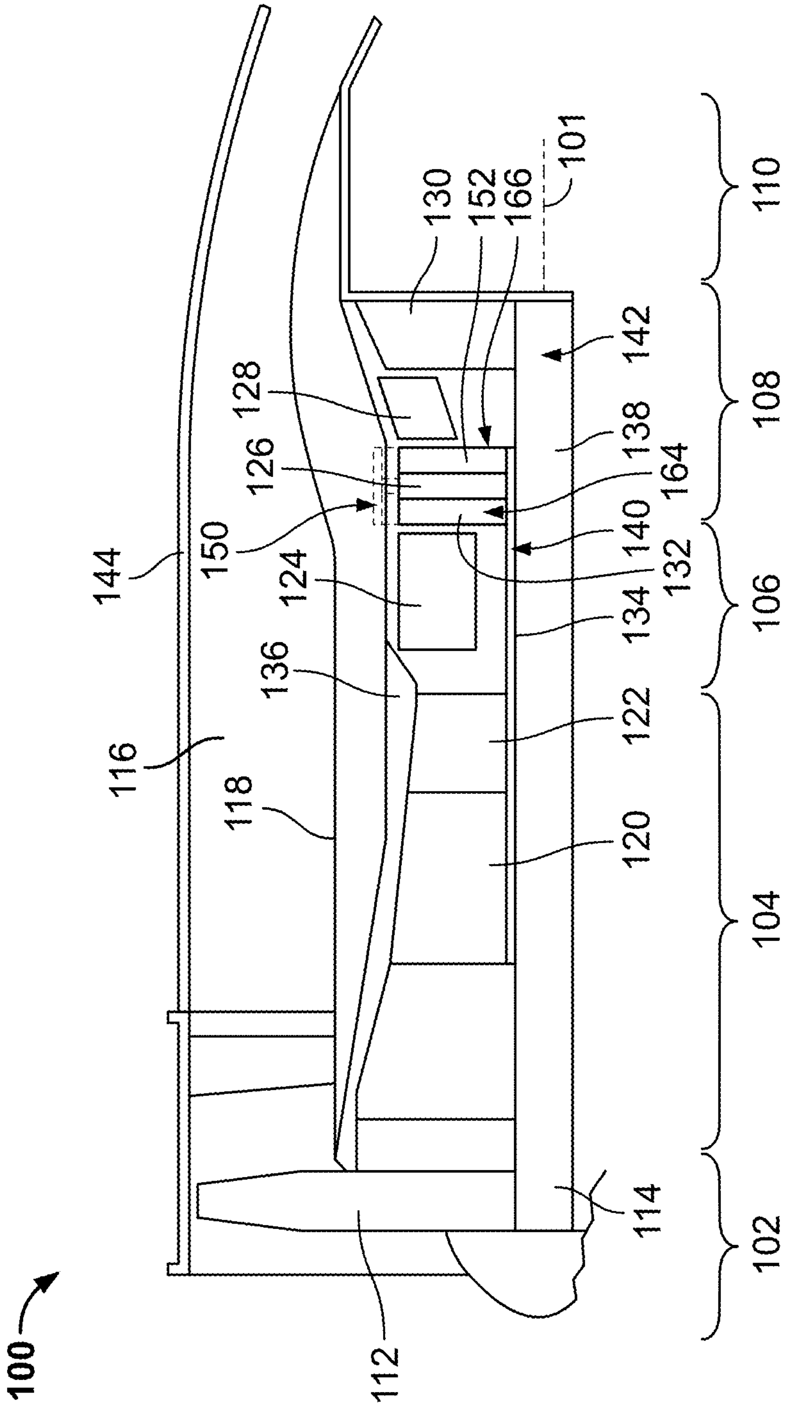
FIG. 1 is a schematic cross-sectional illustration of a half of a gas turbine engine, which includes an exemplary shroud system in accordance with a number of embodiments.

The following detailed description is merely exemplary in nature and is not intended to limit the application and uses.

Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of arrangement that would benefit from shroud systems applicable to applications such as a full ring ceramic shroud. As described herein, the shroud systems may be associated with a gas turbine engine as one exemplary embodiment according to the present disclosure. In addition, while the shroud system is described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "about" denotes within 10% to account for manufacturing tolerances. In addition, the term "substantially" denotes within 10% to account for manufacturing tolerances.

With reference to FIG. 1, a partial (upper half as viewed), cross-sectional view of an exemplary gas turbine engine 100 is shown with the remaining portion of the gas turbine engine 100 being substantially axisymmetric about a longitudinal axis 101. The longitudinal axis 101 comprises an axis of rotation for the rotors of the gas turbine engine 100. In the depicted embodiment, the gas turbine engine 100 is an annular multi-spool, turbofan gas turbine jet engine for use with an aircraft (not shown), although other arrangements and uses are included within the scope of this disclosure.

As will be described further herein, this disclosure includes a shroud system 150 that includes one or more monolithic ceramic shrouds with desirable properties for performance and desirable features for interfacing with a support structure/support case, such as of the gas turbine engine 100. The disclosure is not limited to a gas turbine engine but may be applicable to other applications where high temperature performance and stress management of a shroud and structure is desirable, for example in turbines, compressors, and other rotating machinery. In this example, the shroud system 150 is circumferentially disposed about at least one of two or more stages of a high pressure turbine 126. In other embodiments, the shroud system 150 may be employed at any number of shrouds arranged axially in-series.

In the example of FIG. 1, the application's rotating machinery is the gas turbine engine 100, which is configured as a two-spool engine. It will be appreciated that in other embodiments, a different number of spools with different compressor/turbine arrangements may be employed. The gas turbine engine 100 includes a fan section 102, a compressor section 104, a combustor section 106, a turbine section 108, and an exhaust section 110. The fan section 102 includes a fan 112 mounted on a rotor 114 that draws air into the gas turbine engine 100 and accelerates it. A fraction of the accelerated air exhausted from the fan 112 is directed through an annular space 116 that is generally defined between an inner bypass duct 118 and an outer bypass duct 144, and the remaining fraction of air exiting from the fan 112 is directed into the compressor section 104.

The gas turbine engine 100 in the embodiment of FIG. 1 includes a high pressure spool 140 that includes the high-pressure turbine 126, an axial compressor 120, a centrifugal compressor 122 and a shaft 134, which ties the components together in an assembly. As such, the high pressure turbine 126 drives the axial compressor 120 and the centrifugal compressor 122. In other embodiments, the number of compressors and the type of compressors in the compressor section 104 may vary. In the depicted embodiment the axial compressor 120 and the centrifugal compressor 122 sequentially raise the pressure of the air and direct a majority of the high-pressure air into the combustor section 106. A fraction of the compressed air bypasses the combustor section 106 and is used to cool, among other components, blades 132, 152 in the turbine section 108 and the turbine shroud(s) of the shroud system 150 as described herein. In this embodiment of the gas turbine engine 100, the high pressure turbine 126 includes at least two stages (upstream stage 164 and downstream stage 166) with two sets of blades 132 and 152 arranged in axial series. The blades 132 may have a different diameter at their tips as compared to the blades 152. Each of the sets of blades 132 and 152 are rotors or parts of rotors and are surrounded by shrouds of the shroud system 150. In other embodiments contemplated herein, the high pressure turbine 126 may have only a single stage and the shroud system 150 is configured for the one stage.

A low pressure spool 142 includes a low pressure turbine 130, the fan 112 and a shaft 138. The low pressure turbine 130 may include any number of axial stages appropriate for the application. The shaft 134 is a hollow shaft or shaft-like structure (at least in-part a hollow cylinder or cylindrical shaft), and the shaft 138 extends through the shaft 134. In other embodiments, other components may be coupled in the low pressure spool 142. In additional embodiments, a different arrangement may be employed. For example, the compressor section 104 may include a low pressure compressor and a high pressure compressor. In such an embodiment, the high pressure spool 140 may include the high pressure compressor and the low pressure spool may include the low pressure compressor. In still other embodiments, the shaft 134 may be assembled with other rotating components, such as in a pump or other rotating machinery type pieces of equipment with a different number of spools.

In the combustor section 106, which includes a combustion chamber 124, the high-pressure air is mixed with fuel, which is combusted. The high-temperature combustion air is directed into the turbine section 108. In this example, the turbine section 108 includes the two turbines disposed in axial flow series, namely, the high-pressure turbine 126, and a low-pressure turbine 130. However, it will be appreciated that the number of turbines, and/or the configurations thereof, may vary by application. In this embodiment, the high-temperature air from the combustor section 106 expands through and rotates each turbine 126 and 130. As the turbines 126 and 130 rotate, each drives equipment in the gas turbine engine 100 via the concentrically disposed shafts in their respective spools 140, 142.

Figure 2:
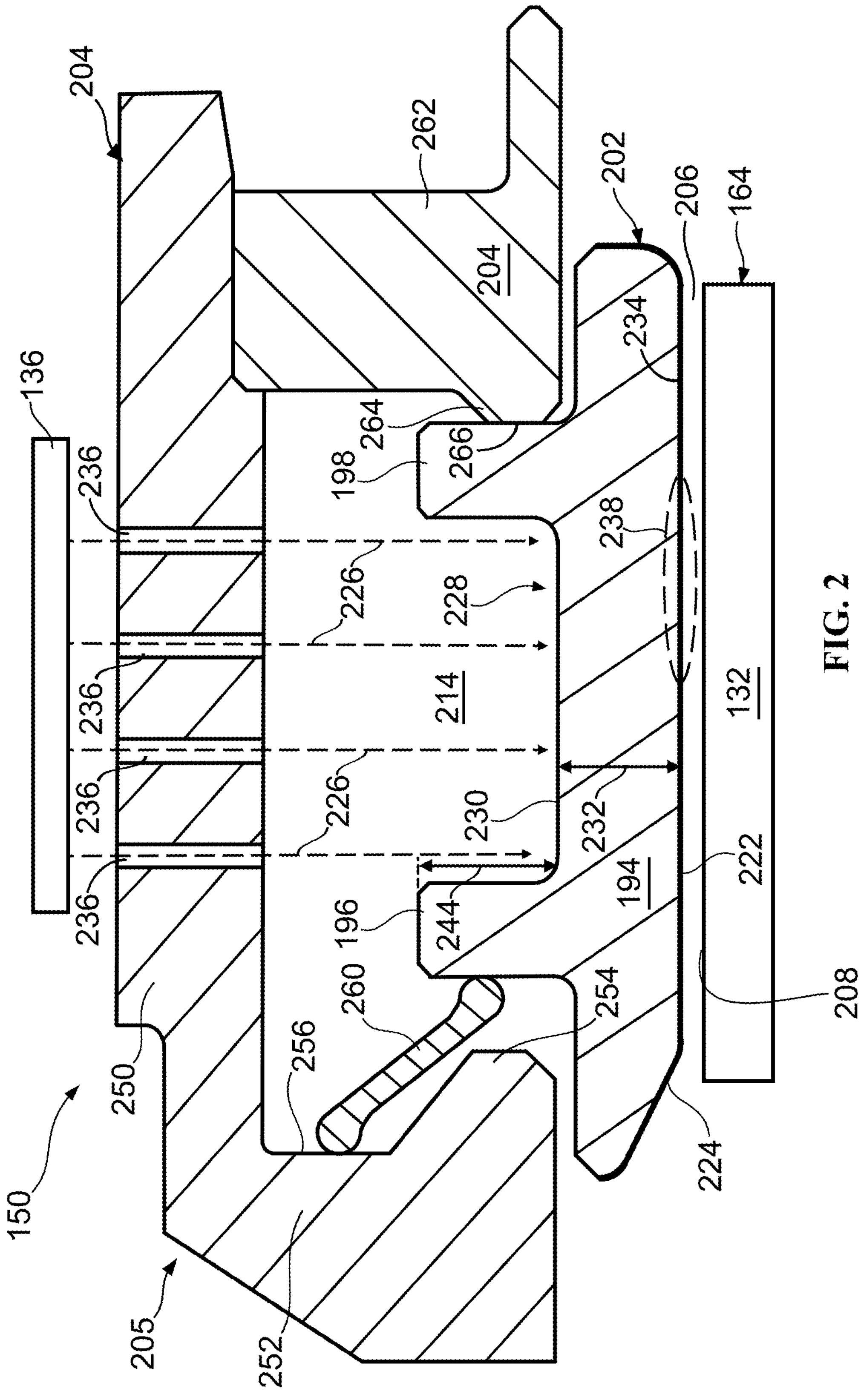
FIG. 2 is a schematic, sectional view of a part of the gas turbine engine of FIG. 1 through a turbine shroud, in accordance with a number of embodiments.

Referring to FIG. 2 along with FIG. 1, a part of the gas turbine engine 100 is schematically illustrated. In this example, the area at one shroud 202 of the shroud system 150 is shown. Other shrouds (not shown) of the engine 100 may be similar and/or may have additional or different features. The shroud 202, which is shown sectioned, is circumferentially disposed about the blades 132 of the upstream stage 164 (FIG. 1) of the high pressure turbine 126. It should be understood that another shroud will be disposed about the blades 152 of the downstream stage 166 (FIG. 1).

A support structure 204 is coupled to, or comprises, a portion of a case 205 associated with the core of the gas turbine engine 100. The support structure 204 may also be referred to as a support case or as the case 205. The support structure 204 defines an annular construction with a recess or space that is referred to as a shroud cavity 214. The support structure 204 is configured as a ring or cylinder shaped structure to extend completely around the longitudinal axis 101. The shroud cavity 214 is annular and opens radially inward toward the axis 101 presenting a space for the shroud 202. The shroud system 150 includes features that position the shroud 202 relative to the blades 132 and the support structure 204, generally within or at the shroud cavity 214. The shroud system 150 includes non-axisymmetric features radially outboard of shroud rails that position the shroud 202, as further described below. These features may enable centering and otherwise positioning the shroud 202 relative to the blades 132 such as to set and control tip clearance.

The shroud 202 includes rails 196 and 198 that extend radially outward from an annular ring referred to as the body 194 of the shroud 202. The body 194 is a cylindrical section configured or shaped as a section of a tube that extends in the axial direction. The rails 196 and 198 extend from the body radially outward into the shroud cavity 214. The rails 196 and 198 are shaped similar to flat washers encircling around the body 194. The rails 196 and 198 are spaced apart from one another and are mirror images of each other in shape.

The case 205, which may also be associated with the combustor section 106, in turn, may be coupled to other structure of the gas turbine engine 100. It should be noted that the placement of the shroud 202 and the support structure 204 about the blades 132 of the high pressure turbine 126 is merely exemplary, as the shroud 202, the support structure 204 and the shroud system 150 may be employed with any turbine in the turbine section 108 and while the shroud system 150 is applicable to high temperature applications, in other embodiments, it may be applied to a compressor, such as in the compressor section 104, or in other applications in other rotating machinery.

The shroud 202 may be disposed concentric with the support structure 204 and with the blades 132 to optimize aerodynamic efficiency. In addition, positioning features allow for the shroud 202 to be placed offset to the engine centerline, such as to accommodate possible rotor droop if desired. This avoids a need for the shroud 202 to be ground to a target dimension within the high pressure case assembly. A radial gap (i.e., blade tip clearance) 206 is defined between the shroud 202 and an outermost diameter (tip 208) of the blades 132. The radial gap of the blade tip clearance 206 is preferably very small. Minimizing blade tip clearance 206 is advantageous for turbine efficiency and overall engine efficiency is turbine efficiency.

The shroud 202 may be made of a material that differs from that of the support structure (support case) 204. For example, the support structure 204 may be metal, for example a nickel-chrome-iron alloy. The shroud 202 may be a monolithic, full-ring ceramic part, made of a material such as silicon nitride. The monolithic full ring design may offer advantages over other options such as a segmented metallic shroud designs, because it may withstand higher turbine inlet gas temperatures and may present fewer leak paths through which air flow may enter the main gas path. Additionally, the low CTE of ceramic, allows for smaller blade tip clearance 206 at critical points in the engine cycle. To maintain a suitably small blade tip clearance 206, the location of the shroud 202 relative to the support structure 204 is tightly controlled throughout the entire range of engine operating conditions (engine cycle). Challenges in providing tight control due to the relatively low CTE of the ceramic shroud 202 versus the CTE of the surrounding metal components are overcome through the shroud system 150 of the current disclosure. In other embodiments, the shroud 202 may be any other material with a different (usually lower) CTE than the support structure 204.

The shroud 202 is made of a material (substrate material) that withstands the high temperatures encountered, such as a ceramic. In the current embodiment, the shroud 202 is constructed from a single blank of silicon nitride shaped to design by machining, such as grinding. The result is that the shroud 202, including the body 194, the rail 196 and the rail 198 are all one monolithic piece forming a structure that encircles the blades 132. The radially inward facing surface 222 of the body 194 is covered with a material that protects the ceramic from the potentially deteriorative environment in the gas path. This may be referred to as an environmental (or thermal) barrier coating (EBC) 224. The EBC 224 is made of a material that exhibits high temperature capability, performance and durability. The EBC 224 may be bonded to, or otherwise secured to, the surface 222. The EBC 224 may be ytterbium disilicate or a similar material. The EBC 224 may be referred to as a thermal barrier coating (TBC) on the substrate material of the body 194 at the surface 222.

Unlike the shroud 202 of this disclosure, many other turbine shrouds may be fabricated as segmented components that are case tied meaning that they have a case 205/support structure 204 interface that draws the segments out radially with the surrounding case 205/support structure 204. However, joints between these shroud segments may grow, such as during temperature changes, which may increase secondary flow leakage, and decrease control of blade tip clearance. The full ring shroud 202 of the current disclosure eliminates the joints and provides a consistent clearance. Rather than being case tied like a segmented shroud, the shroud 202 is not rigidly fixed to the case 205 and has other beneficial interface mechanisms as described below.

Management of thermal gradients, stresses, and shroud/case interface actions may be addressed by aspects of the current disclosure as described herein. For example, temperature gradients, thermal expansion, thermal contraction and thermal shock may be considered and addressed. Changes in operating conditions of the engine 100 may increase the magnitude of the thermal actions that are considered. Effects such as tip clearance control, twisting, coning, surface failure, thermal stress, and various dimensional challenges may also be considered and addressed.

As shown in FIG. 2, the shroud cavity 214 is supplied with cooling air 226, such as from the compressor case 136. As a result, cooling is provided to the radially outer side 228 of the shroud 202. Due to the cooling and the heat in the gas path, the surface 230 (radially outer) of the body 194 is substantially cooler than the surface 222 (radially inner) of the body 194. The thickness 232 of the body 194 in the radial direction has a direct impact of the thermal gradients in the radial direction. The thicker the body 194, the greater the magnitude of the temperature difference and the thinner the body the lower the magnitude of the temperature difference. Accordingly, the thickness 232 is preferably minimized.

In addition, the temperature at the interface 234 between the EBC 224 and the substrate of the body 194 is preferably controlled to avoid overheating and overstressing. To keep the temperatures lower, the cylindrical section of the body 194 is formed as thin as practical. In this regard, it has been found that a thinness limit exists for body 194 itself, below which the body 194 becomes excessively compliant. The thinness limit may also be referred to as a minimum limit for the thickness 232. Excessively compliant means that the body has surpassed a compliance limit where the compliance limit is defined by an amount of flexibility that results in shroud stresses and/or blade tip clearance control exceeding design operational parameter limits for the application. Both the thinness limit and the compliance limit may be determined and defined for each particular application by modelling using commercially available software as supplemented by characteristic testing in the specific application. Forming the body with a thickness 232 below the thinness limit, without using the benefits of the current disclosure, may undesirable result in excessive flexibility and drive up stresses.

To enable forming the body 194 with the thickness 232 below the thinness limit, the rails 196 and 198 are designed to counter the compliance. The rails 196 and 198 extend radially outward from the surface 230. The rails 196 and 198 are parallel with each other in the radial direction and are identical. The rails 196 and 198 are clean, in-that they do not have features extending in the axial direction but have a generally rectangular cross section consistently around their circumference. In the radial direction, the rails 196 and 198 have a span 244 that is substantially larger in magnitude than the size of the thickness 232. The consistent shape of the rails 196 and 198 around the axis 101 means that their effects on the body 194 are consistent three-hundred-sixty degrees around the blades 132.

The rails 196 and 198 are exposed to the cooling air 226 and extract heat from the body 194 generally reducing the temperatures that would otherwise result, including along the gap of the blade tip clearance 206. Lower maximum operating temperatures below a threshold temperature result is lower thermal stress and effects and maintain the shroud within design operational parameters for the engine 100. Controlling the temperature at the interface 234 to below the threshold temperature also avoids spalling of the EBC 224 that may otherwise result. Temperatures below the threshold are maintained by the small thickness 232 and by heat transfer through the rails 196 and 198.

The cooling air 226 may be supplied through openings referred to as holes 236 in the case 205/support structure 204. The configuration of the holes 236 that is shown is an example and many variations are contemplated. Accordingly, the holes 236 supply air to cool the shroud 202, and may be configured differently than shown to provide that function. The area inside the shroud cavity 214 is open, at least for substantially all of the circumference of the shroud 202. This enables direct impingement of the cooling air 226 from the holes 236 to the surface 230. The open area in the shroud cavity 214 also provides space for radial movement of the rails 196 and 198 relative to the support structure 204 during expansion and contraction.

Direct impingement may enhance the cooling effect of the cooling air 226. For example, the cooling air may be directed to a hot spot area 238. Because of hot gas leakage through the gap of the blade tip clearance 206 and other factors, an area around the center (as viewed) of the shroud 202, and/or slightly downstream from the center, has been identified as a hot spot area 238 where the temperature of the material of the shroud 202 may be at a maximum relative to other areas of the shroud 202. In embodiments, hot spots may occur in other locations. In the absence of the benefits of the current disclosure, such as due to the minimal thickness 232 and the rails 196 and 198, these hot spots may result in excessive thermal stress and/or in failure of the bond between the EBC 224 and the surface 222. For example, effects such as spalling or other surface failures may result.

Figure 3:
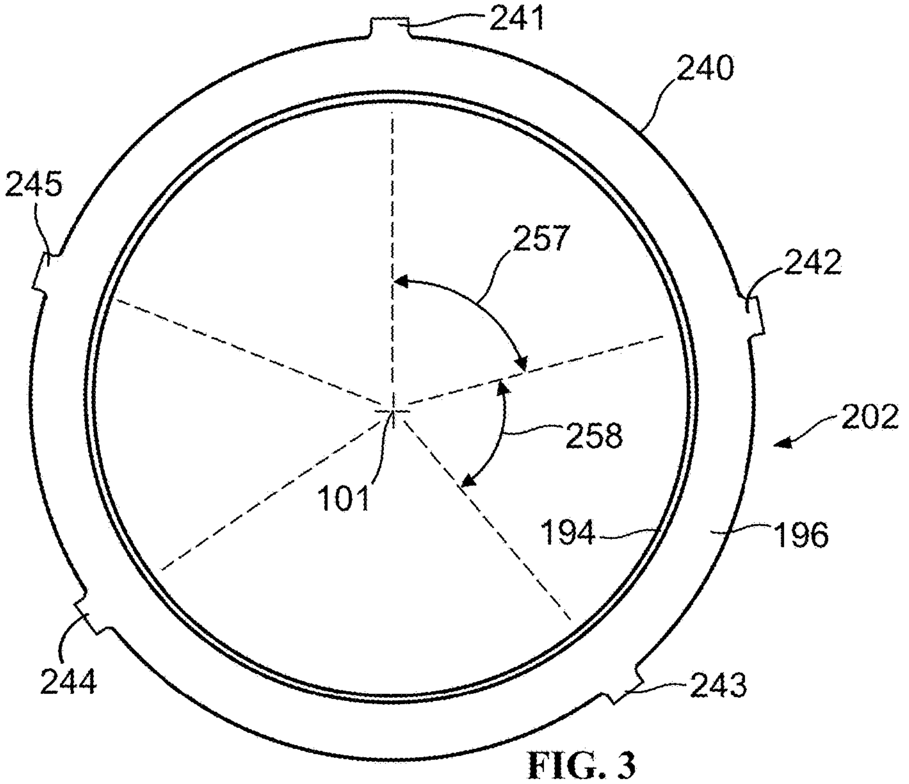
FIG. 3 is an axially directed view of a shroud isolated from the gas turbine engine of FIG. 1, in accordance with a number of embodiments.

As described above, the shroud 202 is not case tied. Referring to FIG. 3, it can be seen that the shroud 202 is annular with the body 194 having a consistent cross-sectional size and shape all around the shroud 202. The rails 196 and 198 have a consistent cross-sectional size and shape substantially all around the shroud 202. The only exceptions are a series of tabs 241-245 that each extend around a short arc of the outer circumference 240 of the rail 196 as seen in FIG. 3. While there are five tabs 241-245 in this embodiment, another number may be used in other embodiments. Other than at the tabs 241-245 the rail 196 has a consistent outer circumference 240. Tabs are also provided on the rail 198 with one tab 246 shown in FIG. 4 corresponding in circumferential location to the tab 241. The rail 198 incudes additional tabs (not shown) corresponding to each of the tabs 242-245.

Figure 4:
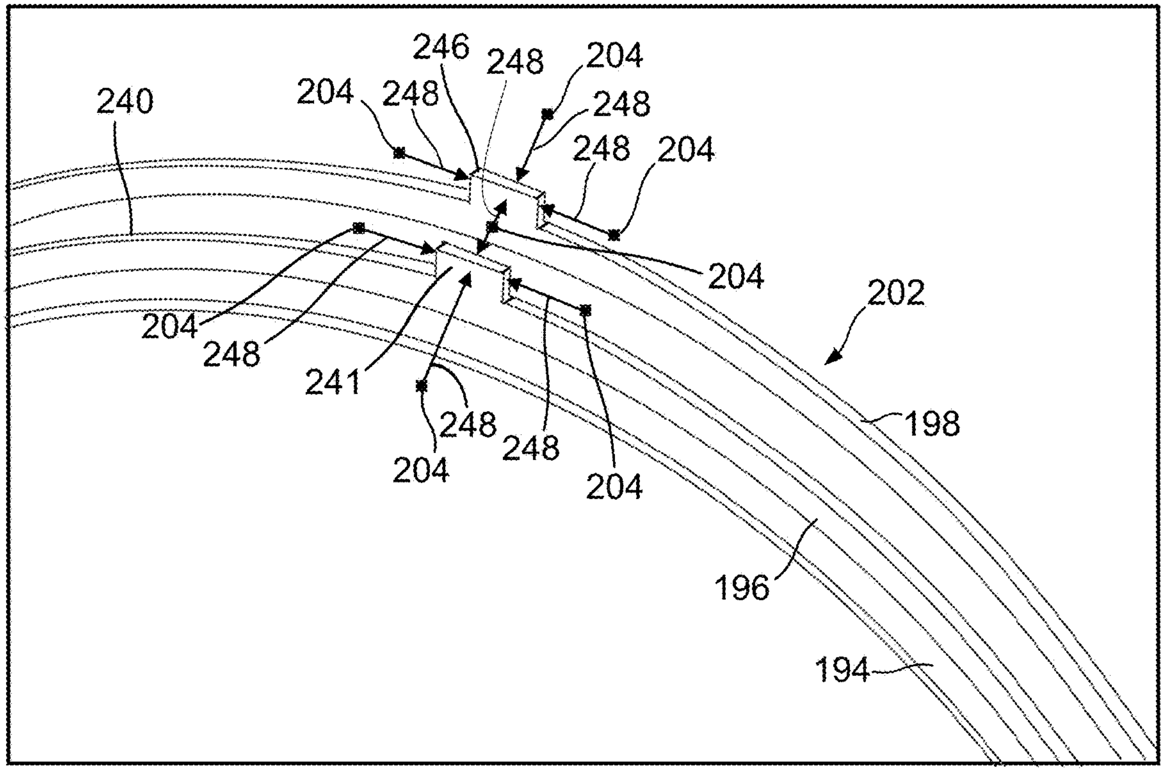
FIG. 4 is a fragmentary, perspective, schematic illustration of part of the shroud of FIG. 3, in accordance with a number of embodiments.

The tabs 241-245 extend radially outward from the outer circumference 240 of the rail 196. The tabs of the rail 198, for example the tab 246, also extend radially outward from the outer circumference of the rail 198. As shown in FIG. 4, the tabs 241 and 246 provide locations to interface with the case 205/support structure 204 through retainers 248 to position the shroud 202 and to maintain the shroud 202 in a centered condition. The retainers 248 may be in the form of clips, blocks, springs, clamps, ramps, cams, eccentrics, bolts and/or other devices that provide positioning contact between the shroud 202 and the case 205/support structure 204. The retainers 248 may include adjustability, centering, and compliance. The retainers 248 engage the shroud 202 at the tabs 241-245, et al. Providing the contact at the tabs 241-245 means that the contact with the shroud 202 is at locations radially outward from the body 194, which are substantially cooler.

As described above, the shroud 202 is not case tied. However, the retainers 248 provide a type of mechanical contact between the metallic case 205/support structure 204 and the ceramic shroud 202. Placing this contact mechanism away from the cylindrical section of the body 194 avoids stress concentrations that would otherwise arise if the connections were placed in regions where the temperature is very high, such as at or near the body 194. The shroud system 150, including the system of parallel rails 196 and 198 with tabs 241-245, enables mechanical connections to be added in much cooler regions of the shroud 202 effectively limiting the temperatures to which the interfacing metallic components of the retainers 248 are exposed.

The system of parallel rails 196 and 198 of the shroud system 150 also provides a substantial sliding interface for rubbing between the shroud 202 and the case 205/support structure 204. As shown in FIG. 2, the support structure 204 includes an annular wall 250 that extends axially across the shroud cavity 214 and defines the radially outer edge of the shroud cavity 214. A radially extending wall 252 defines the upstream edge of the shroud cavity 214 and includes an annular flange 254 that extends partly into the shroud cavity 214 in a downstream direction forming an annular pocket 256 along the radially extending wall 252. While the radially extending wall 252 is upstream in this example, in other embodiments the feature may be located on the aft side of the shroud 202. Accordingly, in embodiments, the radially extending wall 252, and its flange 254, may be forward or aft of the shroud 202.

Various types of additional features, such as sealing features, may be included as part of, or in addition to, the shroud system 150. In one nonlimiting example, a seal 260 extends from the radially extending wall 252 at a point in the annular pocket 256 to the rail 196 sealing the upstream side of the shroud 202. The seal 260 is shaped generally in the form of a conical section and may be referred to as a dog bone seal 260 due to its cross-sectional shape. The seal 260 may flex to extend and compress in the axial direction maintaining contact with the radially extending wall 252 and the rail 196.

At the downstream side of the shroud 202 an insert 262 is disposed adjacent the shroud 202. During assembly of the engine 100, the shroud 202 is placed in the shroud cavity 214 and then the insert 262 is put in place and secured, such as by a press fit, to complete the definition of the shroud cavity 214. The insert 262 provides a radially extending wall and defines the downstream edge of the shroud cavity 214. The insert 262 includes an annular flange 264 that extends partly into the shroud cavity 214 in an upstream direction. The flange 264 includes a surface 266 that contacts the rail 198. The seal 260 may apply a force to bias the shroud 202 against the surface 266 maintaining sealing at both sides of the shroud 202. While the insert 262 is downstream in this example, in other embodiments the insert 262 may be forward or aft of the shroud 202.

A CTE difference between the shroud 202 (ceramic) and the support structure 204 (metallic) components means that the shroud 202 rubs against the support structure 204 during the operation of the engine 100. Specifically, the rail 196 may rub against the seal 260 and the rail 198 rubs against the surface 266 of the flange 264, each at sliding interfaces. The parallel and radially directed rails 196 and 198 enable the shroud system 150 to provide sliding interfaces with sufficient radial length and consistency for bind free movement without driving the cylindrical section thickness of the shroud 202 too high. The rubbing length is assisted by the absence of features on the rails 196 and 198 that would extend in the axial direction and the clean, consistent interface surfaces that are provided.

Accordingly, a shroud system with a system of parallel rails allows minimizing the thickness of the shroud body (cylindrical section of shroud) and provides stiffness through rails that control the amount of deflection of the body. The rails also act as contact elements with the case/support structure. Tabs on the rails maintain a relatively consistent cross section around the shroud while providing features located distant from the body that are cooler for contact with the case, such as through retainers. The tabs are subject to lower thermal gradients and stress. The back side (radial outer side) of the shroud is clean and open to facilitate direct impingement cooling.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A shroud system comprising:

a support structure configured in an annular shape and defining a shroud cavity;

a shroud disposed, at least partly, in the shroud cavity; and a rotor configured to rotate about an axis and disposed within the shroud, wherein the shroud includes a body that has a first surface facing the rotor and a second surface facing away from the rotor, with a gap between the rotor and the shroud, wherein the body comprises a monolithic ring formed from one piece of material with no joints, wherein the shroud includes a pair of rails that are parallel to each other and that are spaced apart from each other, wherein the rails extend from the second surface, wherein the body is configured with a thickness in a radial direction, and the thickness is less than a minimum compliance limit threshold, meaning the body is thin to a point of being flexible to be unable to maintain the gap on its own, wherein the pair of rails are configured to provide stiffness to the shroud to enable the thickness of the body to be less than the minimum compliance limit threshold, wherein each rail in the pair of rails is formed of the one piece of material with the body and has a rectangular cross section that is consistent around a circumference of each rail in the pair of rails, in entirety, with the exception of no more than five tabs that project radially outward from the rectangular cross section.

2. The shroud system of claim 1, wherein the shroud contacts the support structure through the no more than five tabs of each rail in the pair of rails.

3. The shroud system of claim 1, wherein at least one rail in the pair of rails contacts the support structure at a sliding interface.

4. The shroud system of claim 1, wherein the shroud includes an environmental or thermal barrier coating with an interface at the first surface, wherein the rails are configured to maintain the interface below a threshold temperature.

5. The shroud system of claim 1, wherein the shroud includes an environmental or thermal barrier coating with an interface at the first surface, wherein the rails and the thickness in combination are configured to maintain the interface below a threshold temperature.

6. The shroud system of claim 1, wherein the support structure comprises a support case for a turbine, and wherein:

the support structure includes an insert that defines, in part, the shroud cavity, wherein the insert includes a radially extending wall and an annular flange that extends partly into the shroud cavity forming an annular pocket along the radially extending wall and radially outward from the body, and a seal contacts the radially extending wall in the pocket and contacts the shroud at one rail in the pair of rails.

7. The shroud system of claim 1 wherein the support structure includes openings configured to direct cooling air onto the second surface without obstructions.

8. The shroud system of claim 1, comprising retainers establishing contact between the no more than five tabs and the support structure, wherein each rail in the pair of rails includes the no more than five tabs that project radially outward, wherein the retainers contact the shroud at the no more than five tabs.

9. The shroud system of claim 8, wherein the retainers do not contact the body of the shroud directly.

10. The shroud system of claim 1, wherein a hot spot area is defined on the body, wherein the body and the rails are configured to reduce thermal gradients through the hot spot area.

11. A method for managing stress in a shroud, the method comprising:

constructing a support structure in an annular shape and defining a shroud cavity by the support structure;

positioning a shroud, at least partly, in the shroud cavity;

configuring a rotor to rotate about an axis and within the shroud;

forming a body of the shroud with a first surface facing the rotor and a second surface facing away from the rotor, and with a gap between the rotor and the shroud, wherein the body comprises a monolithic ring formed from one piece of material with no joints;

forming a pair of rails on the shroud that are parallel to each other and that are spaced apart, the pair of rails extending from the second surface;

defining a minimum compliance limit threshold for a thickness of the body in a radial direction;

forming the thickness of the body to be less than the minimum compliance limit threshold for flexibility, meaning the body is thin to a point of being flexible to be unable to maintain the gap on its own;

providing stiffness to the shroud by the pair of rails to enable the thickness of the body to be less than the minimum limit threshold; and forming each rail in the pair of rails of the one piece of material with the body and to have a rectangular cross section that is consistent around a circumference of each rail in the pair of rails, in entirety, with the exception of no more than five tabs that project radially outward from the rectangular cross section.

12. The method of claim 11, comprising:

providing contact between the shroud and the support structure through the no more than five tabs of each rail in the pair of rails.

13. The method of claim 11, comprising providing contact at a sliding interface between at least one of the rails in the pair of rails and the support structure.

14. The method of claim 11, comprising:

coating the shroud with an environmental or thermal barrier coating at an interface at the first surface; and maintaining, by the rails, the interface below a threshold temperature.

15. The method of claim 11, comprising:

coating the shroud with an environmental or thermal barrier coating at an interface at the first surface; and maintaining, by the rails and the thickness in combination, the interface below a threshold temperature.

16. The method of claim 11, comprising constructing the support structure as a support case for a turbine and:

constructing the support structure to include an insert that defines, in part, the shroud cavity, and for the insert to include a radially extending wall and an annular flange that extends partly into the shroud cavity forming an annular pocket along the radially extending wall and radially outward from the body, and contacting, by a seal, the radially extending wall in the pocket and the shroud at one rail in the pair of rails.

17. The method of claim 11, comprising:

forming the support structure with openings;

directing, through the openings, cooling air onto the second surface without obstructions.

18. The method of claim 11, comprising:

establishing contact, by retainers, between the no more than five tabs and the support structure;

forming the no more than five tabs on each rail in the pair of rails that project radially outward;

contacting, by the retainers, the shroud at the no more than five tabs; and positioning the retainers to not contact the body of the shroud directly.

19. The method of claim 11, comprising reducing, by the body and the rails, thermal gradients through a hot spot area of the body.

20. A shroud system for a gas turbine engine, the shroud system comprising:

a support structure configured in an annular shape and defining a shroud cavity;

a shroud disposed, at least partly, in the shroud cavity; and a rotor configured to rotate about an axis and disposed within the shroud, wherein the shroud includes a body that has a first surface facing the rotor and a second surface facing away from the rotor with a gap between the rotor and the shroud, wherein the body comprises a monolithic ring formed from one piece of material with no joints, wherein the shroud includes a pair of rails that are parallel to each other and that are spaced, wherein each rail in the pair of rails extends from the second surface, wherein the body is configured with a thickness in a radial direction, and the thickness is less than a minimum limit, where the minimum limit is a threshold at which the body has surpassed a compliance limit where the threshold is defined by an amount of flexibility of the body that results in shroud stresses and/or blade tip clearance control exceeding operational limits for the shroud, meaning the body is thin to a point of being flexible to be unable to maintain the gap on its own, wherein the pair of rails are configured to provide stiffness to the shroud to enable the thickness of the body to be less than the minimum limit and maintain the gap, wherein the shroud includes an environmental or thermal barrier coating with an interface at the first surface, wherein the pair of rails and the thickness in combination are configured to maintain the interface below a threshold temperature, wherein the threshold temperature is a temperature below which the shroud is maintained within operational parameters for the gas turbine engine and spalling at the interface is avoided, wherein each rail in the pair of rails is formed of the one piece of material with the body and has a rectangular cross section that is consistent around the entirety of its circumference with the exception of no more than five tabs that project radially outward from the rectangular cross section.

* * * * *